(12) United States Patent
Tewksbury et al.

(10) Patent No.: US 9,044,896 B2
(45) Date of Patent: Jun. 2, 2015

(54) GUSSETER BOARD WITH RETRACTABLE NOSE

(71) Applicants: Robert J. Tewksbury, Seneca Falls, NY (US); Earl T. Pottorff, Savannah, NY (US)

(72) Inventors: Robert J. Tewksbury, Seneca Falls, NY (US); Earl T. Pottorff, Savannah, NY (US)

(73) Assignee: Pearl Technologies, Inc., Savannah, NY (US)

( * ) Notice: Subject to any disclaimer, the term of this patent is extended or adjusted under 35 U.S.C. 154(b) by 158 days.

(21) Appl. No.: 13/664,466

(22) Filed: Oct. 31, 2012

(65) Prior Publication Data

US 2014/0120201 A1    May 1, 2014

(51) Int. Cl.
*B31B 5/00* (2006.01)
*B29C 53/10* (2006.01)
*B29C 53/20* (2006.01)

(52) U.S. Cl.
CPC .............. *B29C 53/10* (2013.01); *B29C 53/20* (2013.01)

(58) Field of Classification Search
USPC .............. 425/72.1, 326.1, 377, 387.1, 190; 493/293, 439, 450
See application file for complete search history.

(56) References Cited

U.S. PATENT DOCUMENTS

| | | | |
|---|---|---|---|
| 2,631,332 A | 3/1953 | Reber | |
| 3,023,558 A * | 3/1962 | Mitchell | ........................ 53/241 |
| 3,059,549 A | 10/1962 | Seiden | |
| 3,566,756 A | 3/1971 | Schmid et al. | |
| 4,285,686 A | 8/1981 | Ambler | |
| 4,578,051 A | 3/1986 | Everman | |
| 4,650,406 A | 3/1987 | Peters | |
| 5,585,120 A | 12/1996 | Pottorff | |
| 5,700,489 A | 12/1997 | Pottorff | |
| 5,749,822 A * | 5/1998 | Ellsworth et al. | ............. 493/439 |
| 5,942,256 A | 8/1999 | Pottorff | |

* cited by examiner

*Primary Examiner* — Joseph S Del Sole
*Assistant Examiner* — Thukhanh T Nguyen
(74) *Attorney, Agent, or Firm* — Bernhard P. Molldrem, Jr.

(57) ABSTRACT

A gusset board has a retractable nose section that travels along a proximal-distal track and can extend to the tip of the gusset board for production of gusseted film, and can retract below the level of interfering structure and moved away from the extrusion bubble for the production on non-gusseted film. Retraction and extension of the nose portion and rocking of the gusset board can be carried out remotely.

10 Claims, 3 Drawing Sheets

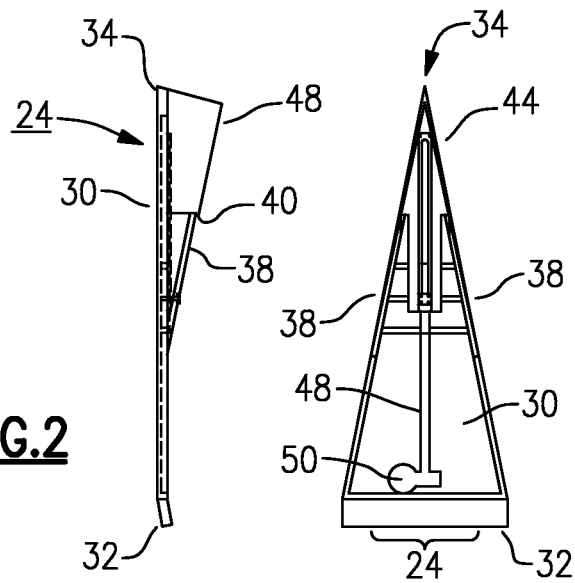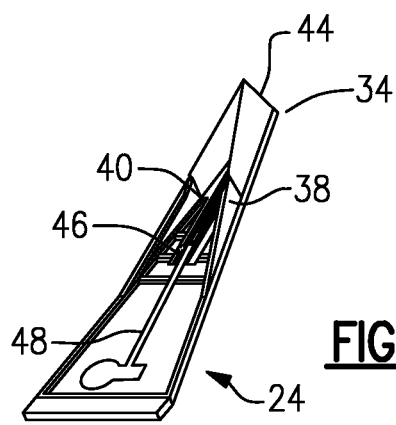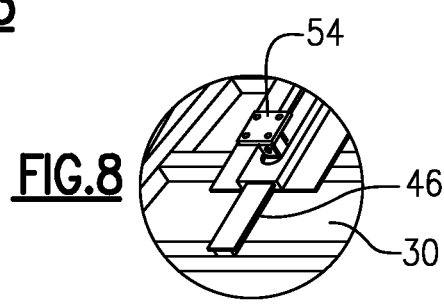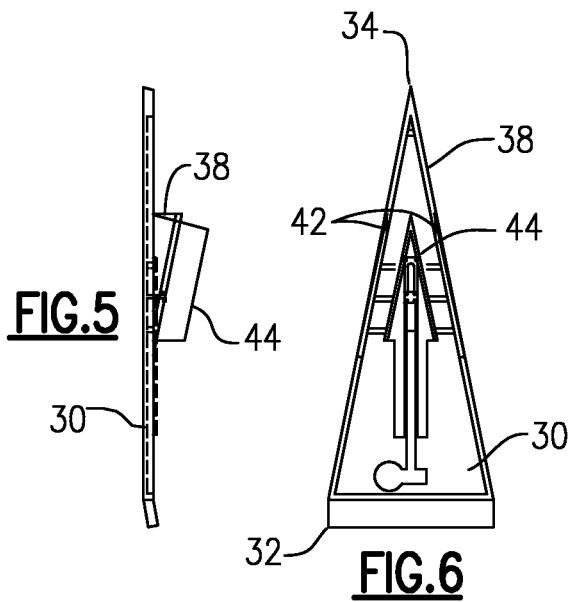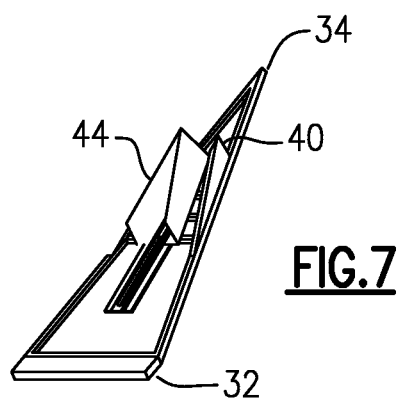

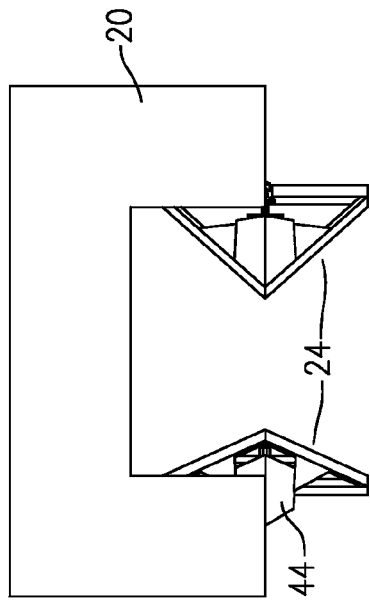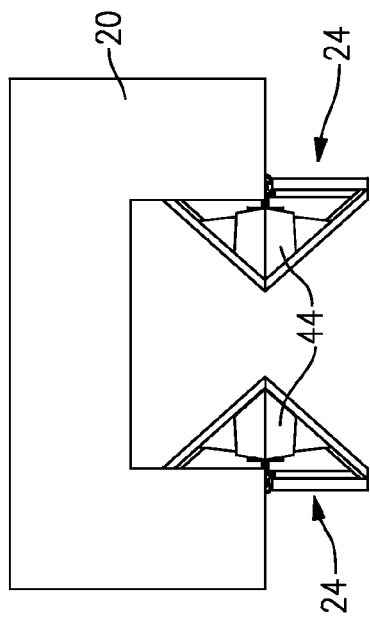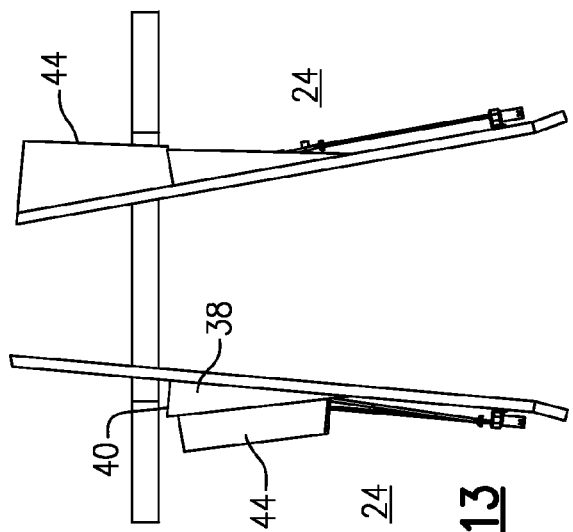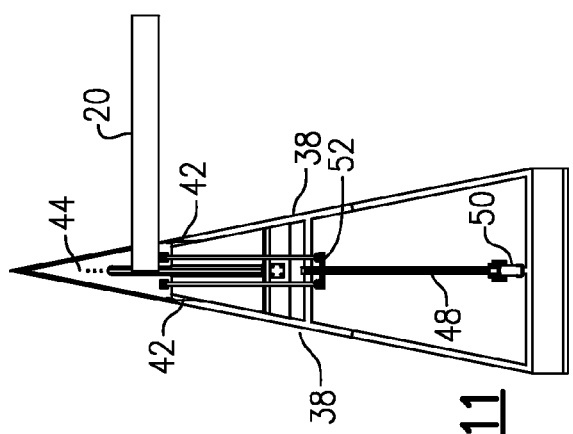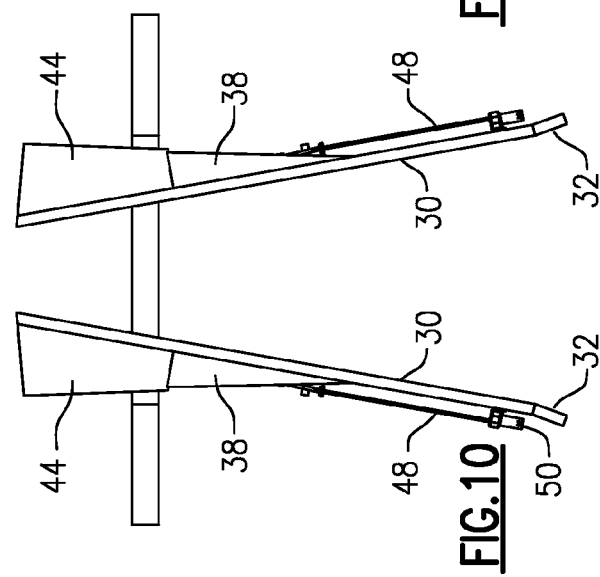

GUSSETER BOARD WITH RETRACTABLE NOSE

BACKGROUND OF THE INVENTION

This invention relates to the manufacture of flexible plastic film handling such as polyethylene film, which may be used in bags, sheets, etc.

Polyethylene film is typically created using a tube extrusion process, in which a tube of the softened plastic material is extruded through an annular die, and is then inflated and expanded until the tube wall is a desired thickness and layflat dimension. The film is typically made in a range of about 0.3 mils to several mils, depending on the end use. After the tube of material is extruded, it is drawn vertically upward, typically a distance of forty feet or higher. The air within the tube expands the tube outward until the plastic sets. On the journey upward, the extruded tube has to be flattened so that it may pass between nip rollers, and then passed to a reel or mandrel where the film is rolled and can be stored for further processing. The flattening is accomplished by a collapsing frame, that is, two facing arrangements of collapsing boards that urge the tubular extrusion to a flattened state by the time the tube reaches the nip rollers. These are usually configured as collapsing frames, each of which has a number of collapsing boards that extend parallel and one above the other on the frame. The nip rollers then press the tube and create a lay-flat film of two thicknesses.

In some cases, it is desired to fold the ends of the extruded tube in prior to the tube reaching the nip rollers, so that the resulting flattened tube is four layers, i.e., four thicknesses of film. To this end gusset boards, also called gusseters or plows, are positioned between the collapsing boards to form inward folds, or gussets, on opposite sides of the extruded tube as the tube progresses upwards. These gusset boards are typically triangular in shape with the apex at the upper end, and with side surfaces that extend back away from the axis to keep the film flat and in place as it passes over the gusseter. The side surfaces have their the greatest lateral dimension nearer the apex, where the folds or gussets are the deepest. The extrusion arrangement invariably has the nip rollers and roll-up equipment positioned on a floor or mezzanine above the top of the collapsing frames, with a round or octagonal opening through which the tube of film passes. When gusseters are used, the tips or apexes of the gusseter boards project upwards through the opening in the mezzanine This requirement means that the mezzanine structure itself obstructs the top of the gusseter if it is desired to move the gusseter out of the way when the equipment is changed over for producing un-gusseted film.

Current techniques for changing over from gusseted film production to ungussetted film production require dismantling or removing the gusseter boards from the extrusion equipment because the nose of the gusseter collides with the frame or mezzanine when the gusseter is tilted back away from the extrusion axis. This requires the labor of several workers for times of an hour or more. There have been proposals for the nose or tip of the gusseter to be removable from the remainder of the gusset board, but this also requires time and effort to remove the nose and later re-install it.

OBJECTS AND SUMMARY OF THE INVENTION

Accordingly, it is an object of this invention to provide an improved gusseting arrangement, in which the nose portions of the gusseting boards can travel between extended and withdrawn positions, and which overcomes the drawbacks of the prior art as discussed above.

It is another object of the invention to provide gusseter with a nose portion that can be moved out of the way of any interfering structure on the equipment frame or mezzanine, in a minimum of time and labor, and without requiring the worker to climb on the equipment to accomplish that task.

It is a further object to provide a gusseter in which the mechanism for moving the nose portion is of a straightforward, reliable, and robust design.

According to one aspect of the present invention, a gusseter is adapted for use in forming gussets in a blown film as the film proceeds along a film extrusion axis, and is formed with a generally planar gusset-forming board of triangular shape having its narrow apex at its distal (upper) end, and its wider base at its proximal (lower) end. The directions proximal and distal are considered in the direction of transport of the film extrusion. The gusseter has a transverse tilt axis to permit the gusset forming board to be rocked towards and away from the bubble axis, as needed for forming either gusseted film or ungusseted film. Generally triangular side walls extend along side edges of the gusset forming board on the outward side, that is, the side away from the extrusion axis. These serve to keep the folds in the film bubble or extrusion properly aligned while the gussets, i.e., folds or pleats, are being created. The triangular side walls have wide ends that meet at the distal apex of the gusset-forming board, and these side walls gradually reduce in width towards the proximal end of the board.

In order to accomplish the objectives, in the gusseter of this invention the triangular side walls are formed of left and right fixed portions that extend proximally from a distal limit that is at least a predetermined distance from the apex of the gusset forming board. This distal limit is designed to be below the position of the interfering structure on the extrusion frame. A movable nose is positioned between the distal tip or apex and the aforementioned distal limit, and is slidably movable in a proximal distal direction through a passage defined between distal ends of the left and right side fixed portions. When there is a production order for ungusseted film, the nose can be positioned beneath any obstructions that are located above the distal limit, and the gusset forming board can be rocked in the direction away from the film axis without colliding with the frame. This can be done remotely by actuating a gearmotor to move the nose between positions, and then moving the board out or in as need be.

In a preferred arrangement, the fixed portions of distal ends of the fixed side walls have planar surfaces at the distal limit which extend parallel to one another and in the proximal distal direction to define passage for the nose portion to pass. A rail is situated on the gusset-forming board and is disposed in the proximal-distal direction, and the nose being slidably mounted on the rail. A rotary threaded rod or drive screw is mounted on the gusset forming board and extends from a gearmotor mounted at a proximal (i.e., lower) portion of the board. A mating threaded member that is affixed on the nose receives the rotary threaded rod. In other embodiments, other linear drive mechanism can be used to move the nose between positions.

Preferably, the gusset forming board includes a triangular plate formed of steel or wood, and may have an angled flange at the base to assist in locating the extrusion as it contacts the gusseters.

A film extrusion arrangement for producing extruded plastic film may incorporate these gusseters so that the equipment may be quickly converted for manufacture of film which may be provided either with or without gusset folds. A die at the base of the equipment provides an extruded tube of a softened plastic material that rises and is inflated, and passes between a pair of collapsing frames to flatten the extrusion. The extrusion passes through an opening in a frame, e.g., through an octagonal or round opening in a mezzanine, to a set of nip rollers to flatten the extrusion for rolling up onto a mandrel or arbor. A pair of gusseters extend upward between the collapsing frames and through the opening in the mezzanine The gusseters face each other across the axis of the extrusion, and are adapted for forming gusset folds in the extruded film before the film reaches the nip rollers.

In the equipment that embodies the present invention, each of said gusseters is formed with a generally planar gusset-forming board that has a triangular shape with a narrow apex at its upper or distal end and a wide base at its proximal or lower end, and each has a transverse tilt axis to permit the gusset forming board to be rocked towards and away from the axis. Generally triangular side walls extend along side edges of the gusset-forming board on a side away from the extrusion axis. These triangular side walls have wide ends that meet at the distal apex of the gusset-forming board and gradually reduce in width in the direction towards the proximal end of the gusset-forming board. The triangular side walls are formed of left and right fixed portions, and a movable nose portion. The left and right fixed portions extend proximally from a distal limit that is a predetermined distance from the apex of the gusset forming board (so that the distal limit is lower than any interfering structure on the extrusion frame). The nose portion is slidably movable in a proximal distal direction through a passage defined between distal ends of the left and right side fixed portions, such that when the gusset forming board is be rocked in the direction away from the film axis, the nose can be positioned beneath such obstructions as are located above the aforementioned distal limit.

The fixed portions of the triangular side walls have planar surfaces at their ends located at the distal limit, and these surfaces extend parallel to one another and in the proximal distal direction so as to define the passage for the movable nose portion between the distal ends of the fixed portions. Each of said gusseters comprises a rail that is oriented in the proximal-distal direction on the respective gusset forming board, and the associated nose is slidably mounted on such rail.

In a preferred embodiment, a rotary threaded rod is mounted on the respective gusset forming board, extending from a gearmotor mounted at a proximal or lower portion of the board, and a mating threaded member that is affixed on the associated nose and which threadably receives the rotary threaded rod.

Certain terms of orientation, such as vertical, upward, downward, upper, lower, axial, radial, left and right may be used in respect to the embodiment described below. However, it should be appreciated that such terms are used for simplifying the description, and that the principles of this invention would apply regardless of the positional orientation of the apparatus.

The above and many other objects, features, and advantages of this invention will become apparent from the ensuing description of an exemplary embodiment, which should be read in conjunction with the accompanying Drawing.

BRIEF DESCRIPTION OF THE DRAWING

FIGS. 2, 3 and 4 are side elevation, front elevation and perspective views of the gusseter according to an embodiment of the invention, showing the movable nose portion thereof in the extended position.

FIGS. 5, 6 and 7 are side elevation, front elevation and perspective views of the gusseter according to this embodiment, showing the movable nose portion thereof in the withdrawn position.

FIG. 8 is an enlarged view of a portion of one of the gusseter.

FIG. 9 is a schematic top view of a pair of gusseters of this invention in connection with a portion of the extrusion equipment frame, where the gusseters are positioned for forming gusseted film.

FIG. 10 is a side view thereof.

FIG. 11 is a front view thereof, showing one of the gusseters from a position away from the extrusion axis.

FIG. 12 is a schematic top view of the pair of gusseters in connection with a portion of the extrusion equipment frame, showing one of the gusseters with is nose in the lowered or withdrawn position and being positioned for forming un-gusseted film.

FIG. 13 is a side view thereof.

DETAILED DESCRIPTION OF THE PREFERRED EMBODIMENT

Figure 1:
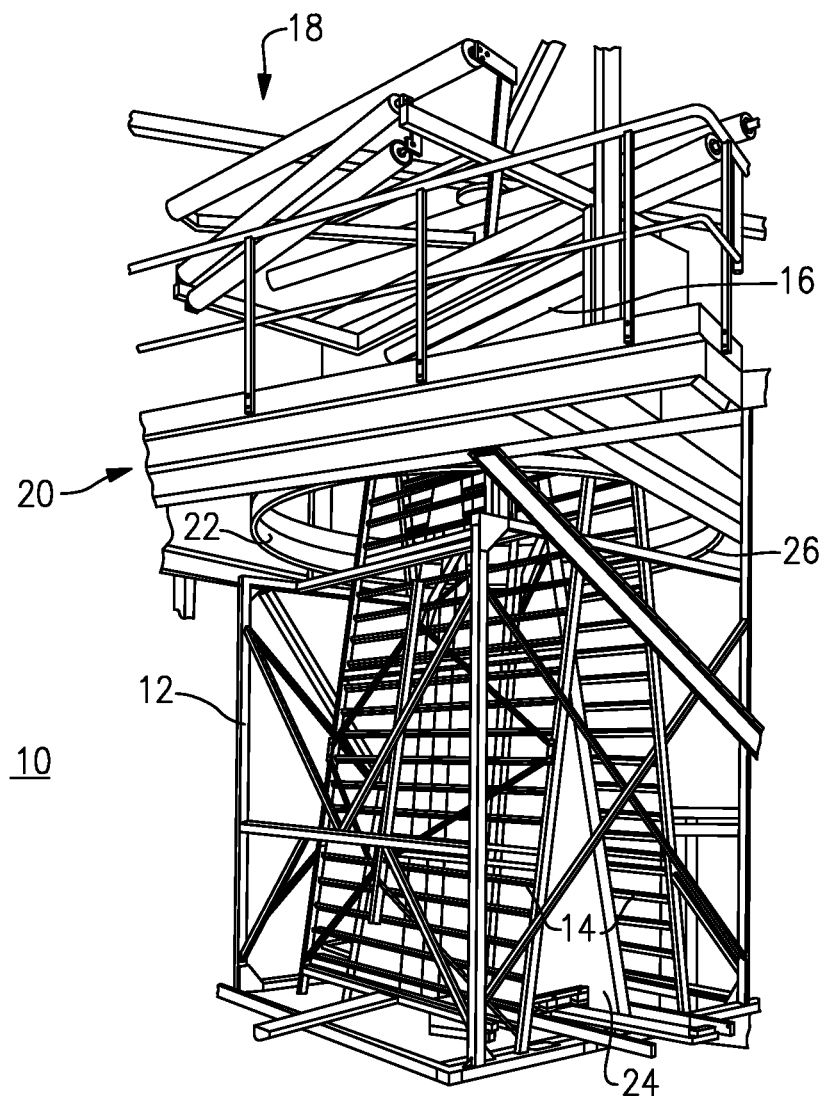
FIG. 1 is a perspective assembly view of a poly film extrusion arrangement in which the improvements of this present invention may be applied to advantage.

The manufacture of plastic film for products such as plastic shopping bags employs a blown film process, which is familiar to those in the poly film industry. In the process, a softened plastic material is extruded from an upright cylindrical die, and the molten plastic extrusion is pulled upwards from the die by a pair of nip rollers at some distance above the die. The nip rollers may be sixty five feet or more above the die. Compressed air is injected into the extrusion at the die, and creates a bubble of circular profile, which expands until the film sets or solidifies. The nip rollers flatten the plastic extrusion into a double layer, e.g., a lay-flat, with a width of half the diameter of the expanded bubble. The film is then rolled up onto a spool or mandrel, and can be processed later on, i.e., printing on it and/or cutting it into shapes and heat-sealing it.

In order to assist in the flattening process, the extrusion or bubble passes between a pair of collapsing frames on the journey from the die to the nip rollers. These frames each comprise a series of parallel collapsing boards and the frames face one another and lean towards one another across the axis of the bubble or extrusion, with the tops of the collapsing frames being close to one another just below the nip rollers.

For some applications, the film needs to be prepared as a roll of four-thickness film. In that case the film is gusseted or pleated, with the ends being pushed in towards the axis before the extrusion reaches the nip rollers. To this end, a pair of gusseters or gusset forming boards are employed to create the pleats or gussets in the material. The gusseters are typically of triangular profile, with the tip or apex at the upper end just below the nip rollers and the wide end or base at the lower end where they first contact the film extrusion. These gusseters are arranged facing one another across the bubble axis and between the two collapsing frames, and tilted in so that the tips are a short distance from one another.

In order to keep the film straight and flat as it is being gusseted, the gusseting boards are provided with side walls on either side, which are of triangular shape with the deepest part being at the tip or apex of the gusset forming board, and then gradually narrowing to the proximal or lower end of the gusset forming board. This results in the gusseter having a "nose" portion at its apex.

As mentioned before, the nip rollers and the upper end of the extrusion arrangement, including the top parts of the collapsing frames and the top portions of the gusseters, where used, are located a great distance above the base of the extrusion equipment, e.g., sixty-five feet or more in many cases. The nip rollers, spooling or wind-up equipment, and other finishing equipment are typically located at or near that same elevated location. Accordingly, there is an extrusion frame supporting that equipment, and normally a floor or mezzanine is provided near the top of the extrusion, i.e., a short distance below the location of the nip rollers, to allow workers to service the equipment. A round or octagonal opening in the mezzanine allows for the extrusion to pass and provides space for the top parts of the collapsing frames and the gusseters.

Plastic film extrusion operations can be understood from some of Applicant's earlier U.S. Patents, including Pottorff U.S. Pat. 5,942,256 and Pottorff U.S. Pat. 5,700,489, and collapsing frames and their role in the extrusion process can be understood from Pottorff U.S. Pat. 5,585,120. The contents of these should be considered to be incorporated by reference herein.

With reference to the Drawing, FIG. 1 shows elements of a typical blown film extrusion operation. A blown film extrusion line 10 here is shown formed within a vertical frame 12. An extrusion die, not shown here, is located at a base of the extrusion line. The extruded bubble proceeds upward between a pair of collapsing frames 14 to nip rollers 16. Other processing and finishing equipment 18 may also be located at the same elevated position as the nip rollers 16.

A floor or mezzanine 20 is supported in the frame 12 at a vertical location just below the nip rollers, so the nip rollers and other equipment can be serviced as need be. Here, a round or octagonal opening 22 in the mezzanine allows for passage of the extrusion or bubble, and also provides a space for the upper part of the collapsing frames 14.

A pair of gusseters 24, here of generally triangular shape, are located between the collapsing frames 14, and the tips or apices of the gusseters 24 project up through this opening 22 as well. A circumferential beam 26 defines the outer limits of the opening 22. The problem that is addressed in the present invention is that this beam 26 interferes with the movement of the gusseters 14 if they are tilted or moved outward from the film extrusion if the blown extrusion line is changed over from production of gusseted film to production of ungusseted film. That is, the nose portion of the gusseter would collide with the mezzanine, or with another portion of the frame, when the gusseters are moved radially out to be clear of the extrusion bubble. This problem has been addressed in the past by physically removing all or part of the gusseters from the extrusion line 10 when ungusseted film was ordered. However, mechanically removing and later re-installing the gusseter, or even only the nose portion of the gusseter, is a labor-intensive and time-consuming process, adding both labor costs and down-time when the line has to be changed over between gusseted film production and ungusseted film production. There are also safety concerns when workers are required to climb and work at elevated pieces of equipment.

The gusseter 24 according to an embodiment of this invention is described here in reference to FIGS. 2 to 7, some detail of which is shown in FIG. 8, and an explanation of its action and its advantage is explained in reference to FIGS. 9 to 14.

Each gusseter 24 is formed with a generally flat, triangular gusseter board 30 with a tail or skirt 32 at its lower or base end, here shown bent outward to assist in guiding the extruded bubble where it encounters the gusseters. The apex 34 is at the distal or top end of the gusseter board. There are generally triangular side walls extending from the apex 34 back down or proximally, with the deepest portion thereof being at the apex 34, and gradually reducing in depth towards the proximal portion of the gusseter board. The triangular side walls are divided at a proximal limit line into triangular fixed wall portions 38, with a distal end 40 being at or below the distal limit. From the distal end 40 inner surfaces 42 extend generally in an axial plane, and define between them a passage for a movable nose portion 44. The nose portion 44 forms the distal portion of the triangular side walls, and has a forward edge positioned at the apex 34 of the gusseter 24. The nose portion 44 is normally extended out to the position shown in FIGS. 2 to 4, 9 and 10 when it is employed in the manufacture of gusseted film. The nose portion 44 is slidably mounted on the gusseter board 30 and can be moved down, i.e., proximally, below the aforementioned distal limit, so as to be out of the way of any interfering structure on the extruding frame permitting the gusseter 24 to be tilted back and away from the bubble when the extrusion line is used for manufacture of ungusseted film.

As shown in FIGS. 3, 4, 7 and 11, the slidable nose portion 44 is fitted onto a slide rail 46 on the back side of the gusseter board 30, to permit the nose portion to move up and down, i.e., between distal and proximal positions. A threaded rod or drive screw 48 extends to the nose portion from a gear motor 50 that is mounted near the base of the gusseter board 30. The rod 48 is fitted in to a female threaded member 52 that is attached to the nose portion to effect proximal-distal motion of the nose portion. This is powered from an electrical supply that is located at a not-shown control panel, so that the movement of the nose portion, and also the tilting in and out of the gusseters 24, can be carried out remotely.

FIG. 8 shows some detail including a mounting fixture 54 on which a control arm (not-shown) is attached that tilts the gusseter in towards the bubble axis and out away from the bubble axis, as required for a given order for poly film.

FIGS. 9, 10 and 11 show the relation of the gusseters 24 to the mezzanine structure 20 (here shown only schematically), with the nose portions 44 extended and with the gusseters 24 tilted in towards one another for manufacture of gusseted or pleated film. The nose portion 44 is above the distal limit and in this position would interfere with the retraction of the gusseters 24 away from the film bubble axis. As shown in FIGS. 12 and 13, when it is necessary to move the gusseter 24 away from the extrusion bubble, the nose portion is retracted downward, so that it reposes below the distal limit and out of the way of the platform or mezzanine, or any other interfering structure on the frame. Here, only the left gusseter is shown tilted out, with the right gusseter remaining in the gusseting position, for purpose of comparison.

With the simple arrangement as shown, and a retractable gusseter nose that can be moved up or down from a remote position, the film extrusion line can be reconfigured from gusseted film to ungusseted film in a few minutes, whereas with conventional gusseters it requires significant time and labor, and can place a worker in a position of risk.

In some preferred arrangements, the triangular gusseter board 30 can be formed of steel or another metal, and may optionally provided without a ceramic coating, with a surface treatment, or with a replaceable wearplate. The triangular fixed wall portions 38 may be steel or may be another suitable durable material with a low coefficient of friction relative to the plastic film workpiece. The nose portion may likewise be made of a suitable metal or synthetic material. A linear drive other than the gearmotor and screw drive illustrated here could be used to move the nose portion between proximal (withdrawn) and distal (extended) positions.

While this invention has been described in detail with reference to a selected preferred embodiment, it should be recognized that the invention is not limited to such embodiment. For example, the movable nose portion could be spring-loaded, or could be arranged to fold down or collapse rather than simply move towards the base of the gusset board. Rather, many modifications and variations will present themselves to persons skilled in the art without departing from the scope and spirit of the invention, as defined in the appended claims.

We claim:

1. A gusseter adapted for use in forming gussets in a blown film as the film proceeds along a film extrusion axis, comprising:
   a base portion that includes a generally planar gusset forming board having a truncated triangular shape with a distal end defining a distal limit of the base portion and a wide proximal end thereof, and having a transverse tilt axis to permit the gusset forming board to be rocked towards and away from said film extrusion axis;
   left and right generally triangular side walls that extend along side edges of the gusset forming board and disposed on a side of said gusset forming board away from said film extrusion axis, the triangular side walls having wide ends situated at the distal end of said gusset forming board and gradually reducing in width towards the wide proximal end of the gusset forming board; and
   an extendible and retractable nose that is slidably movable in a proximal-distal direction through a passage defined between distal ends of said left and right side on the planar gusset forming board of said base portion and extendible and retractable, such that when the gusset forming board is be rocked in the direction away from the film axis, said nose can be retracted proximally of said distal limit and positioned beneath any obstructions that are located above said distal limit.

2. Gusseter according to claim 1, wherein the side walls of said base portion have planar end surfaces at the distal limit which extend parallel to one another and in the proximal distal direction so as to define said passage between the distal ends of the fixed portions.

3. Gusseter according to claim 1, comprising a rail disposed in the proximal-distal direction on said gusset forming board, with said nose being slidably mounted on said rail.

4. Gusseter according to claim 3, in which a rotary threaded rod is mounted on said gusset forming board extending from a gearmotor mounted at a proximal portion of said board, and a mating threaded member that is affixed on said nose and threadably receiving said rotary threaded rod.

5. Gusseter according to claim 1 wherein said gusset forming board includes a triangular plate formed of steel.

6. An arrangement for producing extruded plastic film which may be provided either with or without gusset folds, in which an extruded tube of a softened plastic material rises on a tube axis and is inflated, and passes between a pair of collapsing frames as an extrusion and through an opening in a mezzanine to a set of nip rollers to flatten the extrusion for rolling up onto a mandrel or arbor, and in which a pair of gusseters are provided on opposite sides of the tube axis to extend upward between the collapsing frames and through the opening in the mezzanine, and are adapted for forming gusset folds in the extruded film before the film reaches said nip rollers; wherein each of said gusseters comprises:
   a base portion including a generally planar gusset forming board having a truncated triangular shape with a narrow distal end defining a distal limit of the base portion, and a wide proximal end, and having a transverse tilt axis at said proximal end to permit the gusset forming board to be rocked towards and away from said tube axis;
   left and right generally triangular side walls that extend along side edges of the gusset forming board of said base portion and disposed on a side thereof away from said tube axis, the triangular side walls having wide ends that meet at the distal end of said gusset forming board and gradually reducing in width towards the proximal wide end of the gusset forming board; and
   a nose that is slidably movable in a proximal-distal direction on the planar gusset forming board of said base portion and extendable and retractable through a passage defined between distal ends of said left and right triangular side walls, such that when the gusset forming board is be rocked in the direction away from the film axis, said nose can be retracted proximally of said distal limit and positioned beneath any obstructions that are located above said distal limit.

7. Arrangement according to claim 6, wherein the side walls of said base portions each have planar end surfaces at the distal limit which extend parallel to one another and in the proximal-distal direction so as to define said passage between the distal ends of the fixed portions.

8. Arrangement according to claim 6, each of said gusseters comprising a rail disposed in the proximal-distal direction on the respective gusset forming board, with the associated nose being slidably mounted on said rail.

9. Arrangement according to claim 8, in which a rotary threaded rod is mounted on the respective gusset forming board extending from a gearmotor mounted at a proximal portion of said board, and a mating threaded member that is affixed on the associated nose and threadably receiving said rotary threaded rod.

10. Arrangement according to claim 6 wherein said gusset forming boards each include a triangular plate formed of steel.

* * * * *